United States Patent [19]
Shibata

[11] 3,889,366
[45] June 17, 1975

[54] METHOD FOR PRODUCING ELECTRIC CONTACTS MADE OF INTERNALLY OXIDIZED SILVER ALLOY

[75] Inventor: Akira Shibata, Yokohama, Japan

[73] Assignee: Chugai Denkikogyo Kabushiki Kaisha, Tokyo, Japan

[22] Filed: Nov. 27, 1973

[21] Appl. No.: 419,277

[30] Foreign Application Priority Data
Nov. 28, 1972 Japan................ 47-119216

[52] U.S. Cl. .................... 29/630 C; 29/630 R
[51] Int. Cl. ............................... H01r 9/00
[58] Field of Search... 29/630 C, 420 R, 497, 470.1, 29/480, 630 R; 75/173 R, 173 A, 173 C, 206

[56] References Cited
UNITED STATES PATENTS

| | | | |
|---|---|---|---|
| 2,669,512 | 2/1954 | Larsen et al. | 75/173 A |
| 3,317,991 | 5/1967 | Haarbye | 29/630 C |
| 3,460,735 | 8/1969 | Shibata | 29/630 C |
| 3,488,841 | 1/1970 | Stern | 29/630 C |
| 3,506,437 | 4/1970 | Gwyn | 29/630 C |
| 3,545,067 | 12/1970 | Haarbye et al. | 29/630 C |
| 3,737,999 | 6/1973 | Gwyn | 29/630 C |

*Primary Examiner*—C. W. Lanham
*Assistant Examiner*—James R. Duzan
*Attorney, Agent, or Firm*—Pierce, Scheffler & Parker

[57] ABSTRACT

Balls of silver alloy are internally oxidized and used for the production of electric contacts. The electric contacts produced by using the above internally oxidized balls have much better electric properties than those which are produced by using internally oxidized plate or wire of silver alloy. Further, the above internally oxidized balls have higher ductility than those which are produced by using internally oxidized plate or wire.

Composite electric contacts of internally oxidized silver alloy and base metal produced by a cold welding process contain an increased amount of solute-metal by the use of the above-described internally oxidized balls.

1 Claim, 13 Drawing Figures

100μ

100μ

100μ

METHOD FOR PRODUCING ELECTRIC CONTACTS MADE OF INTERNALLY OXIDIZED SILVER ALLOY

This invention relates to a method for producing electric contacts of silver alloy with a microscopic structure wherein grains of oxide of a solute-metal, —e.g., cadmium, tin, zinc, indium or the like, —are dispersed in a matrix of silver. For the production of this kind of electric contacts, there are known two methods, that is to say, (1) an internal oxidation process wherein plates or wires of silver alloy are roasted to precipitate grains of oxide of solute-metal, and (2) a powder metallurgical process wherein a powder of silver or silver alloy and a powder of oxide of an alloying metal are used as raw materials. However, as the internal oxidation process can be carried out more efficiently and more economically than the metallurigcal process, except the cases wherein the electric contacts can be produced only by the metallurgical process owing to their increased sizes or increased contents of oxide, internal oxidation process is generally adopted. This process can produce electric contacts the density of which is higher than that of electric contacts produced by the metallurgical process. This is another merit of the internal oxidation process, because the resistance to erosion of an electric contact becomes higher when its density is increased.

The internal oxidation process has various advantages and is therefore extensively adopted today. But, the conventional product made by this process has a "deplete zone" in which the concentration of oxide is extremely low in a finally oxidized zone. Further, the grain size of the oxide in the above product increases in the direction of oxidation. The time necessary for the internal oxidation is so long and increases so much with the increase of the concentration of the solute-metal to be internally oxidized that, in the correlation of the diffusing velocity of the solute-metal from the unoxidized zone and the delay of the oxidation, the higher the concentration of the solute-metal the more the coarsening of the grains of oxide on the progressing surface of oxidation and the thickening of the deplete zone.

When an alloy containing the oxide of alloying metal is used for producing composite electric contacts of a cold welding process, the alloy must bear a relatively large amount of cold working which is necessary for this process. In other words, an alloy which can not bear the above necessary cold working cannot be used for the production of composite electric contacts by the cold welding process. For example, a silver alloy which contains 13% of cadmium oxide, as far as it is obtained by heretofore known method, cannot be used for the production of composite electric contacts by cold welding process, because the contacts will have failure cracks on their surfaces.

One object of the present invention is to provide a method which enables the production of electric contacts having a microscopic structure which is free from defects.

Another object of the present invention is to provide a method for producing composite electric contacts by cold welding as one which enables the production of contacts containing higher amounts of alloying metal oxide compared with any heretofore known electric contacts produced by cold welding process.

And, according to the present invention, there is provided a method characterized by producing intermediate pieces of spherical, or pseudo-spherical, shape from a silver alloy, applying the internal oxidation process to the intermediate pieces, cleaning the surfaces of the intermediate pieces and bonding the intermediate pieces to other pieces of base metal to form composite electric contacts by the cold welding process.

In the above expression "pseudo-spherical" is intended to mean a nearly spherical shape and includes a sphere with small flat surfaces at its top and bottom, a sphere with a cylindrical surface of small height at its circumference, a compound surface of spheres, or the like.

In the case of the present invention, production of pieces of spherical or pseudo-spherical shape is very important, because the present invention involves a relation between a diffusing velocity of solute-metal in a silver alloy and an area of surface through which oxygen passes, as will be hereafter explained.

The volume, area, and area per unit volume of a plate, a wire and a ball are calculated as follows:

Plate: Area: $2S$, wherein $S$ is area of one side.
Volume: $St$, wherein $t$ is thickness.
Area per unit volume: $2S/St = 2/t$ Wire: Area: $2\pi rL$ wherein $r$ and $L$ are radius and length respectively.
Volume: $\pi r^2 L$
Area per unit volume: $2\pi rL/\pi r^2 L = 2/r$ Ball: Area: $4\pi r^3/3$
Area per unit volume: $4\pi r^2/(4\pi r^3) = 3/r$ The depth $d$ of internal oxidation for plate is $t/2$ and the depth of internal oxidation for wire or ball is $r$. Accordingly, if the depths of internal oxidation are equal, the ratio of areas per unit volume is $1/d:2/d:3/d = 1:2:3$. This shows that, in the case of a ball, oxygen is supplied through a wider area than in the case of plate or wire. Grain growth of precipitated metal oxide proceeds oxidizing solute-metal which comes inside by diffusion to an oxidation surface. And, in the case of ball wherein oxygen is supplied through a wider surface, grain growth of the precipitated metal-oxide is occurred at a degree much smaller than that of the case of plate or wire. In other words, the surface of oxidation advances faster in the case of ball in comparison with the case of plate or wire, and does not give sufficient time for an appearance of deplete zone by the diffusion of solute-metal. The fact that the center portion of the ball is oxidized finally is also effective for the inhibition of such deplete zone.

The present invention will now be explained in the following, taken with reference to experiments and to the appended drawings in which:

FIGS. 1 to 3 inclusive are microscopic photographs exemplifying differences in the structures of the center portion produced by differences in applying an internal oxidation process to a plate, a wire and a ball;

Figure 11:
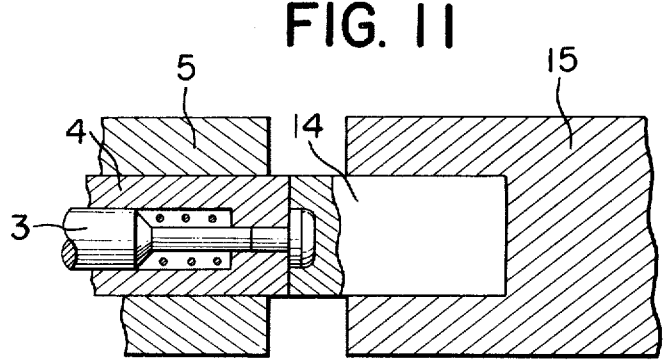
Figure 12:
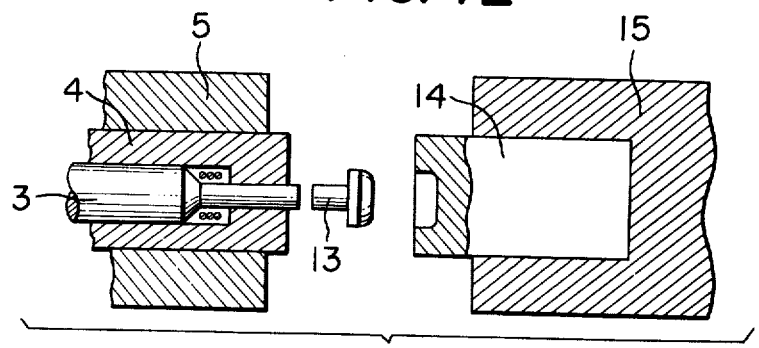
Figure 13:
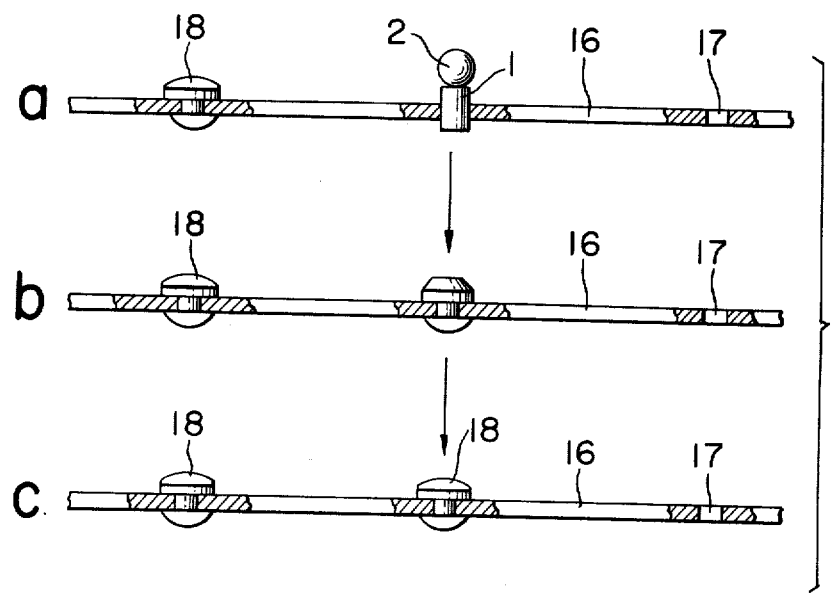

FIGS. 9 to 12 inclusive are process views exemplifying a production of composite electric contacts of rivet form made by using balls obtained by applying an internal oxidation process; and FIG. 13 is a view exemplifying production of composite electric contacts fitted on a thin plate by using the above balls.

Figure 1:
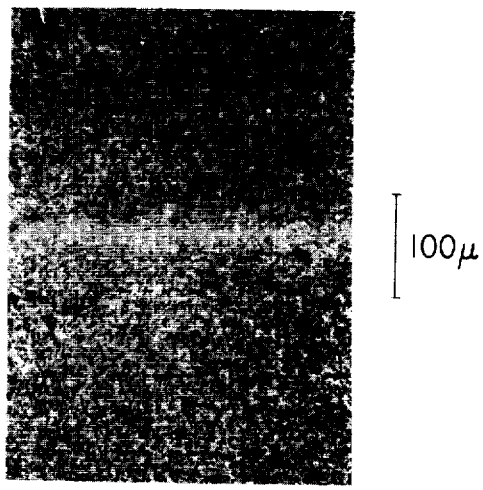
Figure 2:
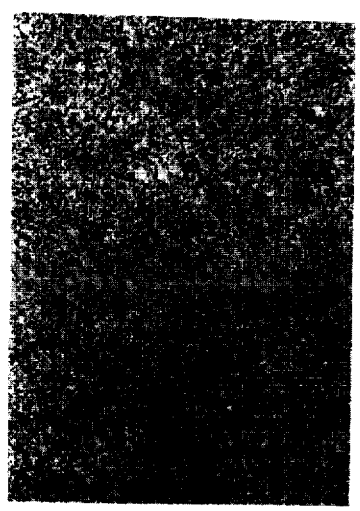
Figure 3:
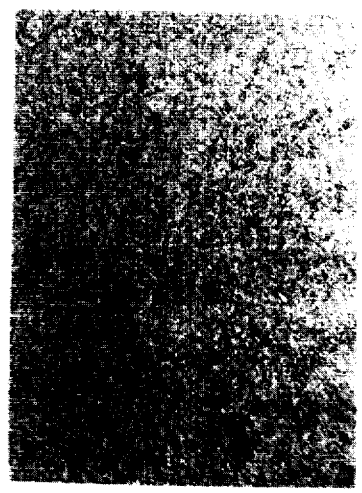

FIGS. 1 to 3 are photographs exemplifying the differences in the microscopic structures due to differences in applying an internal oxidation process to a plate, wire and ball. These were obtained in the following Experiment 1.

EXPERIMENT 1

A plate of 4mm thickness, a wire of 4mm diameter and a ball of 4mm diameter were made of a silver alloy which contained by weight 13% Cd and 0.3% Ni. They were submitted to an internal oxidation process under the following conditions:
Atmosphere:
 Oxygen:Atmospheric pressure
Time:
 92 hours for the plate.
 68 hours for the wire.
 40 hours for the ball.

FIGS. 1 to 3 are microscopic photographs showing the structures of the center portions of the three specimens. The surfaces shown in these figures are: a section at right angle to the center plane in the case of the plate; a section including the center line in the case of the wire; and a section including the center point in the case of the ball. As shown in these Figures, it is recognized that, in the case of the ball, no deplete zone appeared, the grain growth of the precipitated CdO was suppressed, and the size uniformity of the precipitated CdO particles was high.

Figure 4:
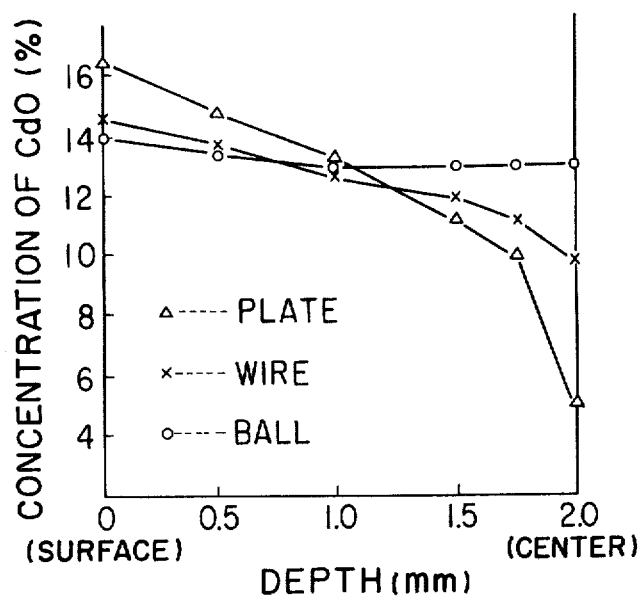
FIG. 4 and FIG. 5 are diagrams showing results of chemical analysis tests and hardness tests made in Experiment 1.
Figure 5:
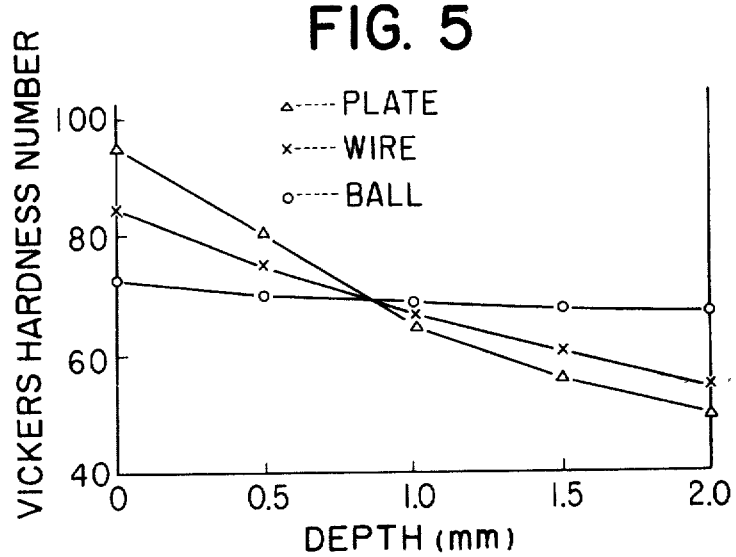

FIG. 4 and FIG. 5 show the results of tests. The chemical analysis tests were carried out by taking samples contained in the respective zones of a thickness of 0.2mm, and the hardness tests were carried out under a load of 200g. It was recognized that, in the case of the ball, the concentration of CdO and the hardness were substantially uniform.

EXPERIMENT 2

Internally oxidized balls of 4 mm diameter produced according to the process shown in Experiment 1 were dipped in sulphuric acid of 20% concentration for 10 minutes so that the precipitated CdO particles at the surface layer were extracted. The thus purified balls were neutralized, water-washed and dried. On the other hand, an alloy wire of 3mm diameter having the same composition as in the case of Experiment 1 was internally oxidized. The obtained wire was pickled, neutralized and water-washed in the same manner as is mentioned above.

Figure 6:
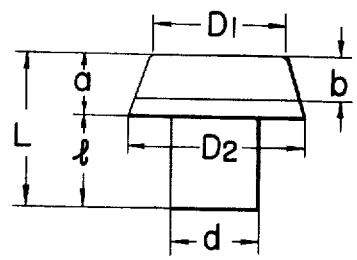
FIG. 6 is a view explaining a shape of composite electric contact made in Experiment 3.

Composite electric contacts in the form of a rivet shown in FIG. 6 were produced using the above internally oxidized balls, wire and a copper wire produced by cold welding process. The dimensions shown in FIG. 6 are as follows:

$D_1$ : 5.5 mm      $D_2$ : 6 mm
          d    : 3.0 mm      a    : 2 mm
          b    : 1.5 mm      L    : 5 mm
          l    : 3   mm

When any cracks were found on the surfaces of the composite electric contacts, these were regarded as defective products. In the case of the products wherein the balls were used, defective products cannot be found, but in the case of the products wherein the wire was used, 45% of products were defective.

EXPERIMENT 3

In addition to the two kinds of composite electric contacts shown in Experiment 2, electric contacts of the same form and composition were produced by a brazing process. The material of noble metal oxide was obtained by applying an internal oxidation process to a plate of silver alloy, and was plated with silver to bond it on a base metal of copper.

Figure 7:
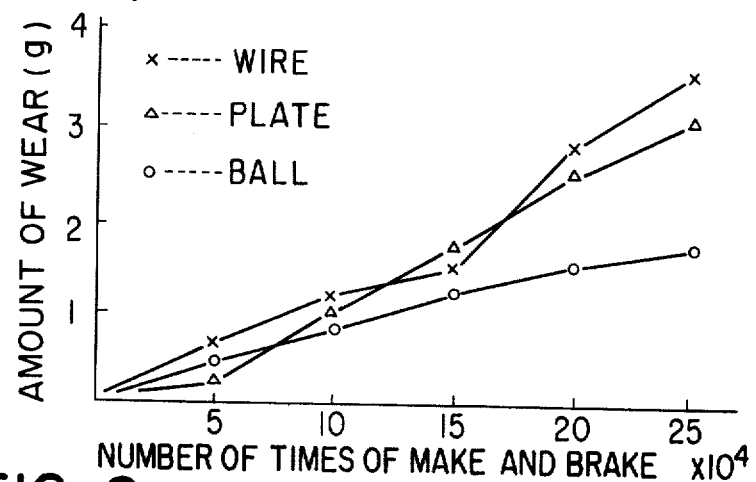
FIGS. 7 and 8 are diagrams showing results of electrical tests made in Experiment 3.
Figure 8:
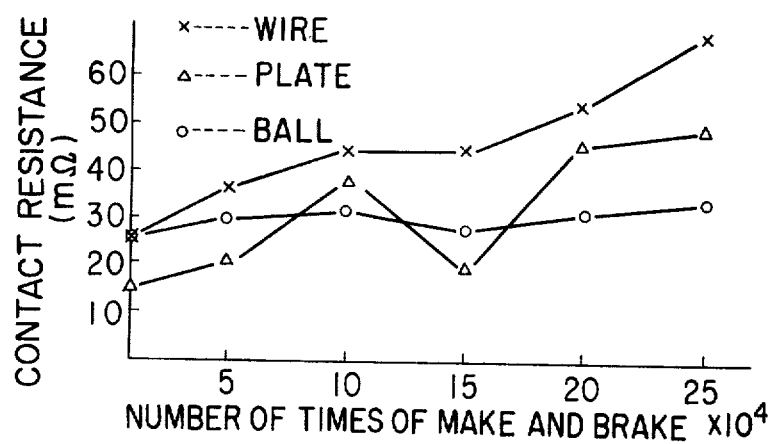

For the thus prepared three kinds of electric contacts (made by using the ball, wire and plate as materials for the Ag—CdO alloy portions), amounts of wear and contact resistance were measured by using an ASTM tester under the following conditions:
 Voltage: 200 Volts
 Frequency: 50 Hertz
 Current: 20 Amperes
 Load: D.C. Resistance and inductance
  Power factor: 0.2
 Make and break: 3600 times/hour (Making time 40%)
 Separating force: 600g
 Contacting force: 400g FIG. 7 and FIG. 8 show the results of the tests. It was recognized that the products made by using the balls were much better both as to wear and in contact resistance than the ones made by using the wire or the plate.

EXPERIMENT 4

In addition to the alloy shown in Experiment 1 (hereafter called "No. 1 alloy"), a silver alloy identified as No. 2, containing 12% Cd, 2.0% Sn and 0.3% Ni was made. Plates of 4 mm thickness, wires of 4mm diameter and balls of 4mm diameter were formed from these No. 1 and No. 2 alloys. The content of solute-metal in the No. 2 alloy is higher than that of the solutemetal in the No. 1 alloy.

The samples of the plate, wire and balls were internally oxidized in an atmosphere of oxygen at 800°C. Under atmospheric pressure and taken out when 20 hours passed. Thickness of internally oxidized zone, that is to say, the depth of internal oxidation of each sample was measured by the microscopic test, and the results shown in the following table were obtained.

|            | Plate    | Wire    | Ball    |
|------------|----------|---------|---------|
| No. 1 alloy | 0.74 mm | 0.85 mm | 1.13 mm |
| No. 2 alloy | 0.67 mm | 0.78 mm | 0.98 mm |

The above Experiment 1 to Experiment 4 inclusive show that the product obtained by applying internal oxidation process to the ball is more improved in its ductility and electric properties as an electric contact than the product obtained by applying internal oxidation process to the plate or to the wire. The fact that the precipitated oxide is not coarsened and is substantially uniformly distributed, the fact that a deplete zone does not appear, and the fact that its hardness is substantially uniform are matters correlated with one another. They are all related with improvements in electric performances such as wear resistance, resistance for contact-welding and property for maintaining a constant contact resistance and also with extensions of applicable ranges of internal oxidation process.

Application of the internal oxidation process to plates of Ag—CdO alloy is limited to those cases wherein the thickness of the plates does not exceed 4mm and the content of Cd does not exceed 10% to prevent occurrence of cracks on the products by internal strain to the precipitation of CdO. However, application of the internal oxidation process is not limited to the above extent for a case wherein balls of Ag—Cd alloy are internally oxidized.

In a case wherein an internally oxidized wire is used for the production of composite electric contacts by cold welding process (by header-forming), ductility necessary for this process is further required. Therefore, application of the internal oxidation process to an Ag—CdO alloy wire is limited to less than 10% for a wire of 4mm diameter and to less than 12% Cd content irrespective of the diameter. But, in a case wherein internally oxidized balls are used for the production of composite electric contacts, the above limit is remarkably relieved. As shown in Experiment 2, an internally oxidized wire produced by oxidizing Ag—Cd alloy containing 12% Cd involves so many defective products owing to its excessive content of Cd. Experiment 2 also shows that the internal oxidized balls can tolerate an increase in the Cd content higher than in the conventional case without producing defective products.

In the case of the present invention, the internal oxidation process is applied to balls of silver alloy made to be of a constant diameter. The balls which are treated for extraction of precipitated oxide from the surface layer are stored for the production of electric contacts. The extraction of the precipitated oxide from the surfaces may be only about the purifying treatment in the case of using the balls for the production of composite electric contacts by cold welding process. However, in the case wherein the balls are formed and brazed to pieces of base metal, it is desirable to carry out the above treatment so as to obtain a silver-rich surface layer of 0.01–0.03mm thickness. Instead of increasing the thickness of the extracted layer, a silver plating may be applied after the purifying treatment.

The internally oxidized balls having had the surfaces purified are used for the production of composite electric contacts. FIGS. 9 to 12 are process views exemplifying the production of composite electric contacts of rivet form.

Figure 9:
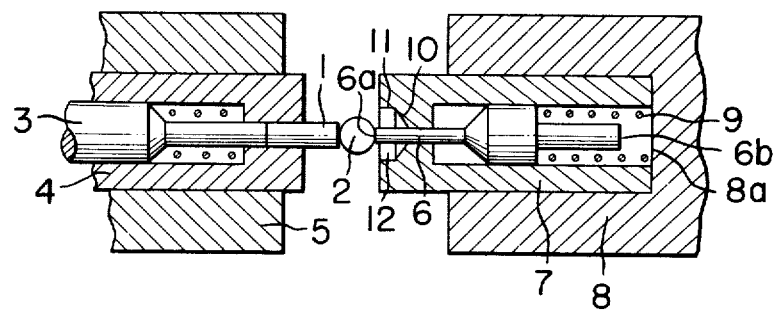

In FIG. 9, numeral 1 shows a piece of base metal and numeral 2 shows a ball of Ag—CdO alloy which is produced by applying internal oxidation process to a ball of Ag—Cd alloy. Hereafter, these will be merely called wire piece 1 and ball 2. This Figure shows the wire piece 1 taken from a wire and the ball 2 in an abutted state.

Figure 10:
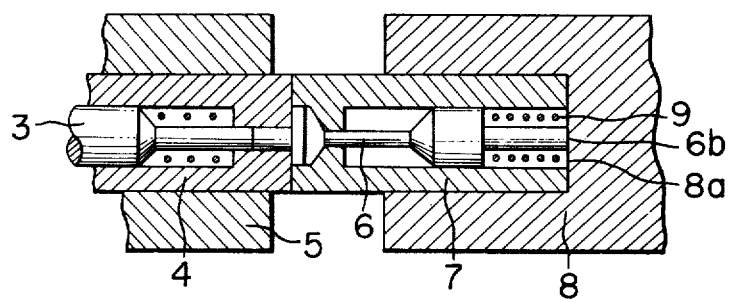

When a ball side assembly consisting of an ejector pin 6, a die 7 and a die holder 8 makes an operating stroke while a wire side assembly consisting of an ejector pin 3, a die 4 and a die holder 5 is stationary, the state shown in FIG. 10 is obtained. The front end surface 6a of the ejector pin 6 is made partially spherical with a radius coinciding with that of the ball 2 so as to be able to stably support the ball 2 in the state shown in FIG. 9. Cold welding between the ball 2 and the wire piece 1 occurs after the ejector pin 6 is subjected to a force exerted by a spring 9 until its rear end surface 6b contacts a receiving surface 8a in the die holder 8. The die 7 on the ball side has a recess 12 consisting of a conical surface 10 and a cylindrical surface 11 following it. The wire piece 1 and the ball 2 are pressed into contact with each other by using the die 7 having such shape that a reasonable flow of material may occur in the ball 2. The composite electric contact manufacturing machine to be used is of a double blow type and it operates to give a first blow for the cold welding and a second blow for the finishing of the shape. The stroke of the second blow is shown in FIG. 11, and the final product 13 ejected from die 14 held by a die holder 15 as shown in FIG. 12.

FIG. 13 shows a method for fitting a train of composite electric contacts 18 on a hoop 16 by using the wire pieces 1 and the balls 22. The hoop 16 is fed intermittently and punched to have a train of holes 17 through which the wire pieces will be inserted. The cold welding between the inserted wire pieces, the fixing of the wire pieces 1 to the hoop 16 and the forming of the composite electric contacts are carried out by using a header of double blow type following the steps a, b, c.

I claim:
1. A method of producing electric contacts, which comprises the steps of
   a. forming intermediate pieces of generally spherical shape and of constant diameter from a silver alloy containing solute-metal, in which alloy the concentration of solute-metal is constant throughout;
   b. applying internal oxidation process to said generally spherical pieces whereby to precipitate throughout said pieces an oxide of said solute-metal of constant solute-metal oxide content;
   c. cleaning the surfaces of the pieces obtained according to step b; and
   d. bonding the cleaned pieces to pieces of base metal by cold welding whereby to form composite electric contacts.

* * * * *